(12) United States Patent
Newsome

(10) Patent No.: US 10,145,446 B2
(45) Date of Patent: Dec. 4, 2018

(54) WARP STRETCH FABRIC AND METHOD

(71) Applicant: James Rollings Newsome, Cheraw, SC (US)

(72) Inventor: James Rollings Newsome, Cheraw, SC (US)

(73) Assignee: Highland Industries, Inc., Kernersville, NC (US)

( * ) Notice: Subject to any disclaimer, the term of this patent is extended or adjusted under 35 U.S.C. 154(b) by 137 days.

(21) Appl. No.: 15/437,068

(22) Filed: Feb. 20, 2017

(65) Prior Publication Data

US 2017/0159749 A1 Jun. 8, 2017

Related U.S. Application Data

(63) Continuation of application No. 14/666,483, filed on Mar. 24, 2015, now Pat. No. 9,599,189.

(51) Int. Cl.
| | |
|---|---|
| *F16G 1/28* | (2006.01) |
| *F16G 5/20* | (2006.01) |
| *F16G 1/10* | (2006.01) |
| *D03D 1/00* | (2006.01) |
| *B29D 29/08* | (2006.01) |
| *D03D 15/08* | (2006.01) |
| *B29K 21/00* | (2006.01) |
| *B29K 105/08* | (2006.01) |
| *B29K 277/00* | (2006.01) |

(52) U.S. Cl.
CPC .............. *F16G 1/28* (2013.01); *B29D 29/08* (2013.01); *D03D 1/0094* (2013.01); *D03D 15/08* (2013.01); *F16G 1/10* (2013.01); *B29K 2021/00* (2013.01); *B29K 2105/0845* (2013.01); *B29K 2277/00* (2013.01); *B29K 2277/10* (2013.01); *B29K 2313/00* (2013.01); *B29K 2995/0094* (2013.01); *D10B 2331/02* (2013.01); *D10B 2331/021* (2013.01)

(58) Field of Classification Search
CPC ........ F16H 7/18; F16H 9/18; F16H 2007/185; F16H 57/023; F16H 57/0456
USPC ....................................................... 474/205
See application file for complete search history.

(56) References Cited

U.S. PATENT DOCUMENTS

| | | | | |
|---|---|---|---|---|
| 2,570,576 | A | * | 10/1951 | Lord .................. F16G 1/04 139/383 R |
| 3,509,006 | A | * | 4/1970 | Baxendale .......... D03D 1/0094 198/847 |
| 3,664,907 | A | * | 5/1972 | Price .................. B29C 65/5042 428/57 |
| 3,665,773 | A | * | 5/1972 | Mitchell ............. B29D 29/00 156/304.6 |
| 3,919,018 | A | * | 11/1975 | Schroeder ........... B60C 9/0028 152/536 |
| 4,231,401 | A | * | 11/1980 | Matuska .............. D03D 15/00 139/383 A |

(Continued)

*Primary Examiner* — Henry Y Liu
(74) *Attorney, Agent, or Firm* — Tuggle Duggins P.A.; Blake Hurt

(57) ABSTRACT

A warp-directional stretch fabric that defines two right faces and is formed from warp yarns defined by a nylon and fill yarns defined by an aramid. The fabric can be incorporated into a toothed belt, for example a transmission belt, to produce a belt that has enhanced structural and resistance capabilities while capable of being produced at a lower cost than prior art belts. A method of producing an improved toothed belt including the fabric is also provided.

3 Claims, 3 Drawing Sheets

(56) References Cited

U.S. PATENT DOCUMENTS

| | | | | |
|---|---|---|---|---|
| 4,392,842 A * | 7/1983 | Skura | ............... | F16G 1/28 474/205 |
| 5,362,281 A * | 11/1994 | Dutton | ............... | F16G 1/28 474/205 |
| 6,086,500 A * | 7/2000 | Yamada | ............... | D03D 1/00 474/202 |
| 2004/0094223 A1* | 5/2004 | Johnson | ............... | D21F 1/0036 139/383 A |
| 2008/0032837 A1* | 2/2008 | Unruh | ............... | F16G 1/28 474/143 |
| 2011/0003659 A1 | 1/2011 | Wu et al. | | |
| 2011/0305829 A1* | 12/2011 | Michiels | ............... | B60C 9/22 427/207.1 |
| 2012/0252619 A1* | 10/2012 | Uchigashima | ............... | F16G 1/10 474/205 |
| 2012/0309573 A1* | 12/2012 | Well | ............... | B29D 29/08 474/205 |
| 2013/0040771 A1* | 2/2013 | Well | ............... | F16G 1/10 474/205 |
| 2013/0337956 A1* | 12/2013 | Motozaki | ............... | F16G 1/04 474/205 |
| 2014/0116596 A1* | 5/2014 | Michiels | ............... | B60C 9/22 152/526 |
| 2014/0120791 A1* | 5/2014 | Renken | ............... | D02G 3/48 442/60 |
| 2014/0087904 A1 | 6/2014 | Avery et al. | | |
| 2014/0150398 A1* | 6/2014 | Onbilger | ............... | D02G 3/48 57/210 |
| 2014/0287862 A1* | 9/2014 | Yamada | ............... | F16G 1/10 474/204 |
| 2014/0296012 A1* | 10/2014 | Fleissner | ............... | B65G 15/34 474/262 |

* cited by examiner

WARP STRETCH FABRIC AND METHOD

This is a continuation of and claims benefits under pending prior application Ser. No. 14/666,483 filed 24 Mar. 2015, now U.S. Pat. No. 9,599,189 issued Mar. 21, 2017, which is incorporated by reference in its entirety herein.

FIELD OF THE INVENTION

The invention herein pertains to fabrics for belts and particularly pertains to double-faced warp stretch fabric for use with transmission belts and the like.

DESCRIPTION OF THE PRIOR ART AND OBJECTIVES OF THE INVENTION

Toothed power transmission belts, timing belts, and serpentine belts are known in the art and widely available commercially. These belts may be formed out of rubber and contact the drive motor shaft with one or more teeth to transmit rotational energy for a myriad of uses, for example an automotive alternator, power steering pump, water pump, air conditioning compressor, air pump and the like. Due to the high environmental temperatures and constant stress, it is not uncommon for these belts to suffer cracking and degradation leading to failure. One solution to this phenomenon is to cover the inner surface of the belt, including the teeth, with a durable fabric to prevent cracking and provide reinforcement and abrasion resistance during belt use. Current fabrics exhibit significant elongation or stretch in the lateral or "fill" direction, which is required for the belt building and tooth formation process. To accomplish effective manufacture of a covered, toothed timing belt, a lateral width stretch fabric has to be cut and rotated ninety degrees (90°) to allow the stretch factor to be in the longitudinal length direction to accommodate tooth formation. Therefore, there exists a need for a woven fabric with a high stretch residing in the longitudinal or "warp" direction since belt sizes and splices in the belts are controlled by the width of the fabric. Further, the desired fabric has a limited porosity to prevent rubber bleed through during tooth formation.

These belts may be formed with a woven fabric, but the weaving process can be very expensive. Knitting the belt fabric is an efficient, low-cost option (see for example U.S. Patent Publication No. 2014/0087904) which can produce a fabric demonstrating the necessary porosity to control rubber bleed through during the belt tooth formation process and has to be used with the same width cover methods as other knits. There are significant benefits to a woven fabric with high elongation in the warp direction since this would significantly reduce the cost of belt assembly and production and allow automated manufacture of belts by eliminating the cutting and turning of the fabric to position the high stretch warp portion in the fabric in the proper plane for tooth formation. Thus, in view of the problems and disadvantages associated with prior art devices, the present invention was conceived and one of its objectives is to provide a toothed belt with a reinforced fabric covering an exterior surface with a single splice point for the fabric covering.

It is a further objective of the present invention to provide a highly durable oil-resistant fabric that mimics the traditional surface texture of the existing width elongation fabrics positioned about the exterior surface of a belt.

It is another objective of the present invention to provide a satin weave for maximum blocking of fluid such as rubber by the fabric positioned about the exterior surface of a belt while giving the same fabric wear properties of a width stretch twill constructed fabric.

It is still another objective of the present invention to provide a double-faced fabric with a satin weave and a twill appearance.

It is yet another objective of the present invention to provide a double-faced fabric with a broken twill construction defining a four harness satin weave construction.

It is a further objective of the present invention to provide a double-faced fabric formed from an aramid material and a nylon material.

It is still a further objective of the present invention to provide a double-faced fabric formed from a relaxed nylon in the warp configuration and an aramid material in the fill position.

It is yet a further objective of the present invention to provide a double-faced fabric with a material in the fill position that experiences less than twenty-five percent (25%) elongation when supporting a five pound (5.0 lb) weight.

It is another objective of the present invention to provide a double-faced fabric with a material in the warp position that experiences at least forty-five percent (45%) elongation when supporting a five pound (5.0 lb) weight.

Various other objectives and advantages of the present invention will become apparent to those skilled in the art as a more detailed description is set forth below.

SUMMARY OF THE INVENTION

The aforesaid and other objectives are realized by providing a toothed transmission belt including an interior portion and at least one exterior surface defining a plurality of rounded teeth. A woven fabric is positioned over the teeth of the exterior surface wherein the woven fabric is a double-faced (i.e. hybrid) woven fabric with one face defined primarily by para-aramid yarns and the other face defined primarily by nylon yarns. The fabric is formed in a broken twill pattern including a four harness weave configuration, producing a fabric with the para-aramid yarns and the nylon yarns substantially exposed on one side of the fabric or the other, allowing for targeted characteristics such as chemical resistance or abrasion resistance on one or both sides of the fabric. A method of producing an improved toothed transmission belt as described above is also provided.

DETAILED DESCRIPTION OF THE PREFERRED EMBODIMENT AND OPERATION OF THE INVENTION

Figure 1:
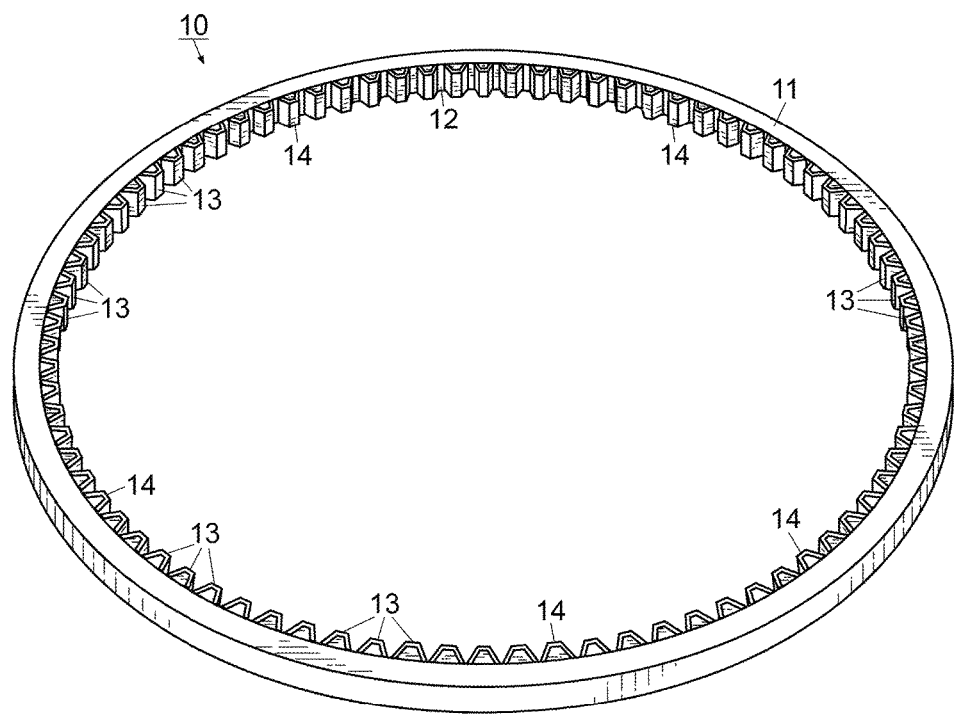
FIG. 1 shows a schematic representation of a toothed belt with warp stretch fabric.
Figure 2:
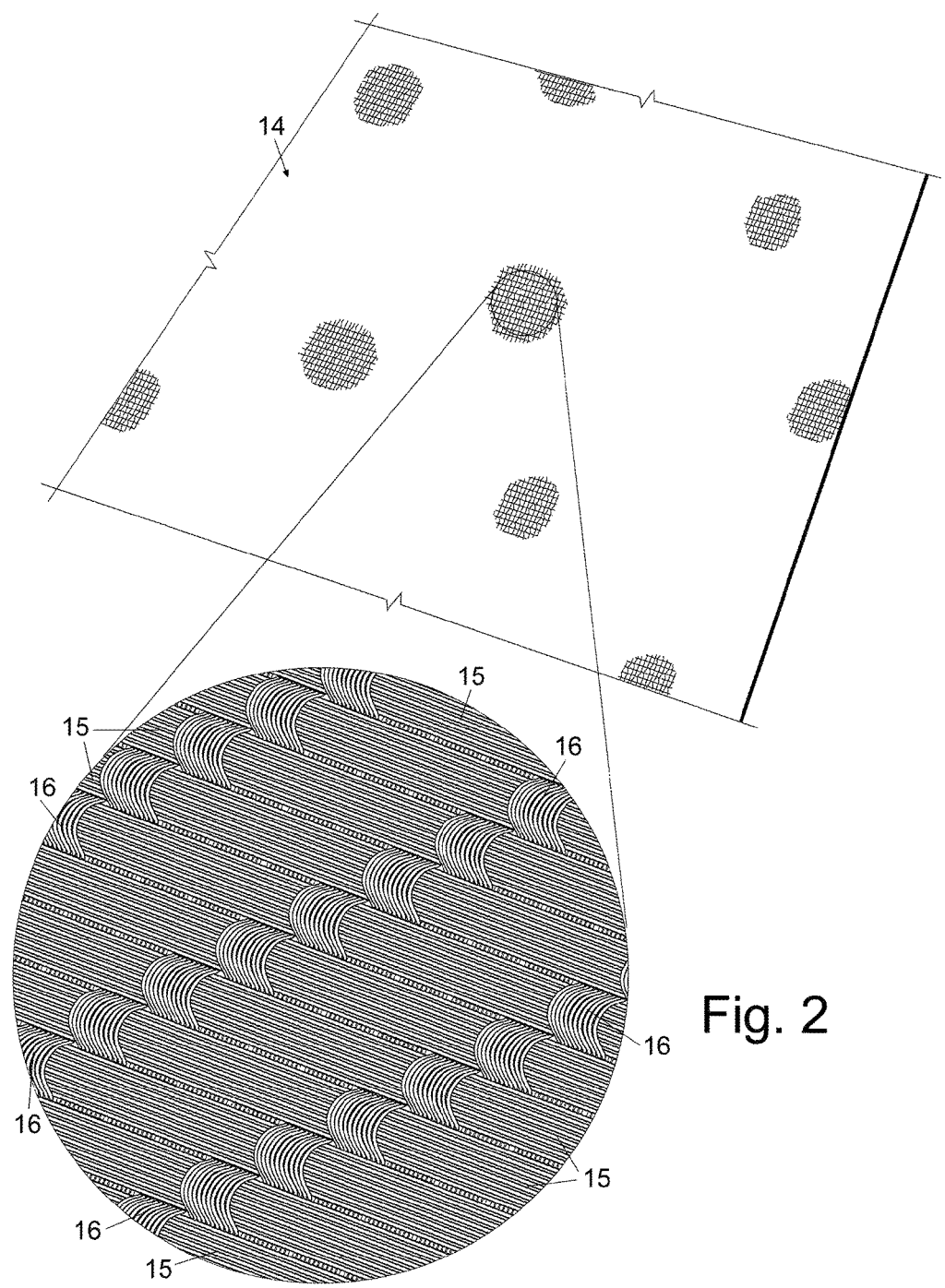
FIG. 2 pictures a perspective view of a first side of the warp stretch fabric of FIG. 1.
Figure 4:
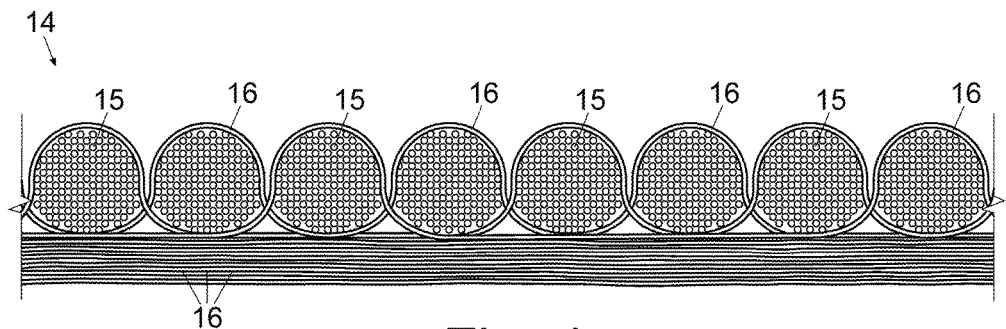
FIG. 4 demonstrates an elevated side view of a cross-section of the warp stretch fabric of FIG. 1.
Figure 3:
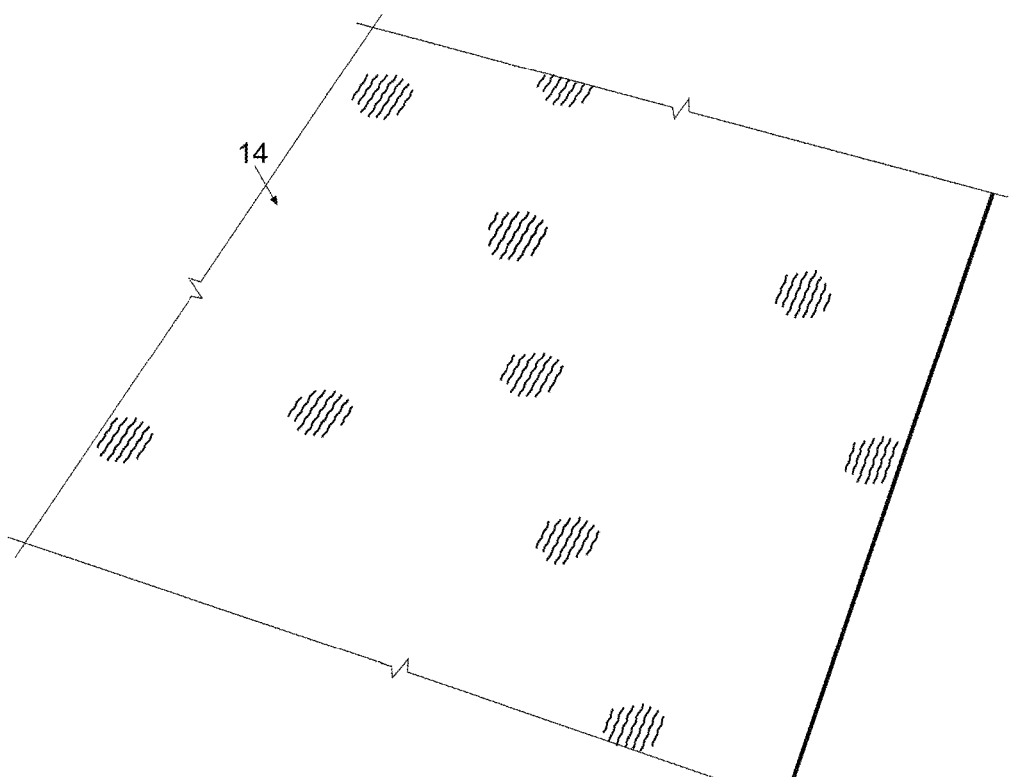
FIG. 3 depicts a perspective view of a second side of the warp stretch fabric of FIG. 1.

For a better understanding of the invention and its operation, turning now to the drawings, FIG. 1 schematically illustrates toothed belt 10 formed from interior or core material 11 defining at least one or more exterior surfaces 12 including a plurality of teeth 13. Toothed belt 10 is typically circular, but it should be understood that the exact measurements and configurations of toothed belt 10 should not be construed as a limitation on toothed belt 10. Embodiments of belt 10 are formed from interior materials such as rubber, polymeric derivatives, and other belt materials as are known in the art. Toothed belt 10 may be used in mechanical modes, for example in the automotive context to contact a drive motor shaft with one or more teeth 13 to transmit rotational energy for uses such as an alternator, power steering pump, water pump, air conditioning compressor, air pump and the like (not shown). Due to the harsh operating environments of toothed belt 10, for example when disposed as a belt-in-oil, it is not uncommon for a toothed belt 10 to degrade over time and structurally fail. Therefore, preferred toothed belt 10 further includes fabric 14 attached to one or more exterior surfaces 12 and covering a plurality of teeth 13. In addition to structural protection, embodiments of fabric 14 may convey abrasion resistance properties, chemical resistance properties, stretch resistance properties, or other desirable properties.

Preferred fabric 14 is a double-faced (i.e. hybrid) woven webbing formed from one or more yarn types oriented in the warp (i.e. longitudinal) and fill (i.e. lateral) positions. Embodiments of fabric 14 may be formed with warp yarns 15 and fill yarns 16 formed from the same material, but preferred fabric 14 is formed with two "right" faces with warp yarns 15 formed from a first material and fill yarns 16 formed from a second material, it being understood that the first and second materials are different materials. A preferred embodiment of fabric 14 is formed from warp yarns 15 formed from a polymeric material such as nylon 6, 6. A second preferred embodiment of fabric 14 is faulted from fill yarns 16 formed from an aramid derivative such as meta-aramid or para-aramid materials. Nothing in these preferred embodiments should be construed as a limitation as to the materials used to form fabric 14l and it should be understood that one or more materials could be utilized as both warp yarns 15 and fill yarns 16 within the scope of the instant invention. Examples of such materials include, but are not limited to, polyamideimide (available under the tradename Kermel™), polyarylate (also known as liquid crystal polyester, available under the tradename Vectran™), polyphenlenebenzobisoxazole (available under the tradename Zylon™), polybezimdazole (available under the tradename PBI Gold™), polyphenylene sulfide (PPS), polytetrafluroethylene (PTFE), polyetheretherketone (PEEK), carbon, stainless steel, D and E glass (also known as fiberglass), basalt, and wool.

Fabric 14 may be formed from a number of different methods such as knitting, weaving, braiding, extruding, or other textile construction methods as are known in the art but the preferred method of formation for fabric 14 is weaving the fabric and then attaching it to exterior surface 12 of toothed belt 10 as the belt is molded to define teeth 13. The weaving pattern in a woven pattern may be selected for aesthetics or visual appearance, but the preferred pattern may also convey structure advantages, such as enhanced structural stability or increased abrasion resistance and increased blocking of rubber from interior side of belt to flow through to the exterior surface. The weaving pattern may also affect the use of the fabric, as certain patterns may form spaces between warp yarns 15 and fill yarns 16, for example allowing some fluids such as air or water to pass through the fabric while restricting other fluids such as oil or liquefied polymers and rubbers. An embodiment of fabric 14 may be double-faced, in that there are two right faces of the fabric. While the faces may be completely distinct and attached through non-textile means, for example an adhesive, the preferred configuration of fabric 14 is referred to as a warp twill, indicating that each respective face is formed primarily from either warp yarns 15 or fill yarns 16. An embodiment of the warp twill defined in fabric 14 may be referred to as a broken warp twill, a configuration that produces a diamond shape on the fabric surface. A schematic representation of such a pattern is shown in Table 1:

TABLE 1

| 4 | 3 | 2 | 1 | ↓ |
|---|---|---|---|---|
| X | X |   | X | 1 |
| X | X | X |   | 2 |
| X |   | X | X | 3 |
|   | X | X | X | 4 |

Each face may be formed from a variety of stitch styles, but one preferred stitch type defined on both faces is generally referred to as a satin weave, though having an identical weave style on both faces is not a requirement. In addition to the weave configuration, fabric 14 preferably defines a warp yarn 15 and fill yarn 16 pattern known as a four harness pattern, meaning that at respective ends of fabric 14, ends of warp yarns 15 pass above four (4) crossing fill yarns 16 before passing below one (1) crossing fill yarn 16 on a first face, or ends of fill yarns 16 pass above four (4) crossing warp yarns 15 before passing below one (1) crossing warp yarn 15 on a second face. This pattern produces a first face of fabric 14 that is approximate seventy-five percent (75%) defined by warp yarns 15 and approximately twenty-five percent (25%) by fill yarns 16.

Fabric 14 can be formed on a number of weaving machines, but preferred fabric 14 is woven with a straight draw on a weaving machine configured with highly polished reeds, heedles, and a plurality of groups of drop wires (not shown), such as a two hundred-twenty centimeter (220 cm) Picanol Optimax Rapier™ weaving loom. The preferred total reed spread is sixty-seven and two tenths of an inch (67.20") at fifteen and an eighth (15.625) dents per inch and four (4) dents per end, with a usable reed spread of sixty-five and forty-one hundredths of an inch (65.41") totaling one thousand fifty (1050) dents and one thousand twenty-two (1022) usable dents. This method of manufacture is capable of producing fabric 14 with a greige width of sixty-two to sixty-five inches (62.0-65.0") and a finish width between fifty-nine and sixty-one inches (59.0-61.0") while defining about sixty-five percent (65%) airspace within fabric 14 and weighing approximately four and eighty-eight hundredths ounces per square yard (4.88 oz/sq yard).

A method of producing toothed belt 10 includes the steps of providing interior or core material 11 and molding it into a circular belt defining at least one exterior surface 12. The method also includes weaving fabric 14, for example on a two hundred-twenty centimeter (220 cm) Picanol Optimax Rapier™ weaving loom, by weaving high-stretch polymeric warp yarns 15 formed from a nylon material such as nylon 6, 6, among fill yarns 16 formed from an aramid material such as meta-aramid or para-aramid. The weaving step may further include weaving warp yarns 15 and fill yarns 16 in a satin weave, more specifically in a four harness satin weave, and more specifically still a four harness satin weave in a broken twill pattern. This passing of warp yarn 15 over four fill yarns 16 before passing below the next in a progressive (i.e. continuously moving the over/under pattern in successive warp ends) creates a diagonal pattern which produces the shape of a diamond on the surface of fabric 14. By utilizing different material for warp yarns 15 and fill yarns 16, these weaving steps produce a fabric with two right faces, capable of bestowing the resulting fabric with customizable stretch and resistance characteristics. An embodiment of fabric 14 may also include the weave of one or more catch-cords (not shown) formed from a polyester material. An alternate embodiment of fabric 14 includes a feathered edge selvage (not shown). One or more embodiments of fabric 14 may undergo bulking, slitting, drying, stabilizing, coating, or other finishing steps after which preferred fabric 14 is then molded to exterior surface 12 of toothed belt 10 and pressure is used to form teeth 13, producing belt 10 that needs less processing time and is lighter in weight than the prior art, while exhibiting stretch characteristics and abrasion resistance due to the nylon material defining warp yarns 15, chemical resistance and structural support to the aramid material defining fill yarns 16, and improved noise reduction characteristics resulting from the double-faced fabric 14.

The illustrations and examples provided herein are for explanatory purposes and are not intended to limit the scope of the appended claims.

I claim:

1. The method of producing a toothed belt comprising the steps of:
   providing a core material, warp yarns defined by a first material, and fill yarns defined by a second material,
   molding the core material into a circular belt with at least one exterior surface,
   weaving the warp yarns and the fill yarns into a fabric defining a satin pattern, whereby the woven fabric exhibits more than forty-five percent (45%) elongation in the warp direction and less than twenty-five percent (25%) elongation in the fill direction
   attaching the fabric to the circular belt exterior surface, and
   molding the circular belt to define a plurality of teeth;
   whereby weaving the warp and fill yarns further comprises weaving a four harness satin weave in a broken twill pattern.

2. The method of claim 1, whereby the satin weave pattern is double-faced.

3. The method of claim 1, whereby the core material is rubber.

* * * * *